United States Patent
Kato et al.

(10) Patent No.: US 6,609,244 B2
(45) Date of Patent: Aug. 19, 2003

(54) DESIGN METHOD OF A LOGIC CIRCUIT

(75) Inventors: Naoki Kato, Kodaira (JP); Kazuo Yano, Hino (JP); Hidetoshi Chikata, Higashiyamato (JP); Shunzo Yamashita, Tokyo (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

(21) Appl. No.: 09/931,879

(22) Filed: Aug. 20, 2001

(65) Prior Publication Data

US 2002/0157080 A1 Oct. 24, 2002

(30) Foreign Application Priority Data

Apr. 20, 2001 (JP) ........................................ 2001-121975

(51) Int. Cl.[7] .............................................. G06F 17/50
(52) U.S. Cl. .............................................. 716/18; 716/1
(58) Field of Search ........................................ 716/1–18

(56) References Cited

U.S. PATENT DOCUMENTS

| | | | |
|---|---|---|---|
| 5,274,601 A | | 12/1993 | Kawahara et al. ..... 365/230.06 |
| 5,581,202 A | | 12/1996 | Yano et al. ................. 326/101 |
| 5,963,454 A | * | 10/1999 | Dockser et al. ................ 716/18 |
| 6,026,228 A | * | 2/2000 | Imai et al. ..................... 716/18 |
| 6,124,736 A | | 9/2000 | Yamashita et al. .......... 326/113 |
| 2001/0020290 A1 | * | 9/2001 | Lam et al. ...................... 716/7 |

FOREIGN PATENT DOCUMENTS

| | | |
|---|---|---|
| JP | 5-210976 | 8/1993 |
| JP | 7-130856 | 5/1995 |
| JP | 11-161470 | 6/1999 |

* cited by examiner

*Primary Examiner*—Matthew Smith
*Assistant Examiner*—Sun James Lin
(74) *Attorney, Agent, or Firm*—Miles & Stockbridge P.C.

(57) ABSTRACT

Even if only logic circuits described in HDL are distributed over a network, if the logic synthesis ability is insufficient, the overall design capability cannot be enhanced; e.g., a sufficient performance of a gate level logic circuit cannot be attained, or it takes a long time to complete logic synthesis. Considering design skills for logic synthesis are considered as property, the invention enables distribution of design skills between a plurality of design sites over a network interconnecting computers. Charges for a design skill are set for the rates of improvement to the performance of the logic circuit that was refined by the design skill. Desired circuit performance can be attained in a shorter period by shortening the design phases in which an RTL logic circuit is supplied as input and by logic synthesis thereon, a gate level logic circuit is output.

7 Claims, 8 Drawing Sheets

FIG. 3

| PERFORMANCE IMPROVEMENT / PERIOD | 5~10% | 11~15% | 16~20% | ≧21% |
|---|---|---|---|---|
| ≦48HRS | ¥1,000,000 | ¥2,000,000 | ¥3,000,000 | ¥5,000,000 |
| ≦3DAYS | ¥750,000 | ¥1,500,000 | ¥2,500,000 | ¥4,500,000 |
| ≦7DAYS | ¥250,000 | ¥750,000 | ¥1,500,000 | ¥4,000,000 |

SYNTHESIS CONSTRAINT : (1) THE INCREASE OF CIRCUIT SIZE IS LESS THAN 10%
(2) THE INCREASE OF POWER CONSUMPTION IS LESS THAN 10%

DESIGN METHOD OF A LOGIC CIRCUIT

BACKGROUND OF THE INVENTION

1. Field of the Invention

The present invention relates to a logic circuit designing method, and more particularly, to a method for designing high-performance logic circuits within a shorter period.

2. Description of Related Art

At present, the most generally used method for designing logic circuits is such that logic functions on a register transfer level or behavior level are described in a Hardware Description Language (HDL) and the logic described on these levels is converted to logic on the gate level by using a logic synthesis CAD tool. Circuit elements called "cells" (generally, a cell having a primitive logic function such as AND, OR, etc.) are pre-designed and the logic synthesis CAD tool is provided with a library in which the designed cells are stored with cell performance parameters such as logic function, layout size, delay, power consumption, etc. By assigning the cells from the library to the logic functions described on the register transfer level or behavior level, a logic circuit (gate level netlist) described in view of cell-to-cell connection is generated from the logic functions described on the register transfer level or behavior levels. The gate level netlist is then passed to a further design process, namely, a layout process.

During the above logic synthesis process, synthesis constraints are given when the cells from the library are assigned to the logic functions. First, constraints of logic circuit design specifications; that is, target values of circuit area, operating speed, power consumption, etc. are given. A logic circuit configuration must be set up to fulfill these constraints. Secondly, external constraints to a logic circuit are given. The external constraints includes: e.g., load capacitance of a cell for driving an input port of the logic circuit to be generated by logic synthesis, load capacitance of a wire or cell connected to an output port of the logic circuit, time at which a signal arrives at the input port, time required for a signal from the output port to pass before arriving at an external flip-flop. Thirdly, wire load constraints assumed for the laid-out logic circuit are given. For example, a wire load assumed, based on a virtual wire load model is given as load capacitance per fan-out.

To summarize the above, the logic synthesis process is supplied with a logic circuit netlist described in HDL, synthesis constraints, and cell library, optimizing the logic structure and assigning the cells to the logic functions are executed during the process, and a gate level netlist of logic circuit is output from the process. Hereon, designing a logic circuit on the register transfer level or behavior level is normally aimed at implementing target logic functions. In most cases, sufficient attention is not paid to physical performance parameters, such as circuit area, operating speed, power consumption, etc. after the logic circuit is implemented with actual semiconductor elements. Consequently, modifying the HDL description, executing the logic synthesis, and evaluating the parameters such as circuit area, operating speed, power consumption, etc. in the gate level netlist generated as the result of the logic synthesis, are repeated so that target specifications are attained.

Even if this logic synthesis process starts, supplied with the same source file described in HDL, the result of logic synthesis, the performance of the generated logic circuit varies, depending on the expertise of synthesis, e.g., what logic synthesis CAD tool is used, how to use the logic synthesis CAD tool, and what synthesis constraints are set. Moreover, if different cell libraries are supplied, naturally, different gate level netlists having different values of performance parameters are output.

With a rapid advance of recent semiconductor technology, the logic circuit scale mountable on a semiconductor chip has increased. On the other hand, logic circuit designers encountered a problem that possible logic design scale does not catch up with the increase of circuit scale. Consequently, logic circuit designers reuse circuit property of a logic circuit that has been designed and used to solve this problem, which appears to be a new trend.

Because logic circuits described in the above-mentioned HDL are independent of semiconductor process and technology, a logic circuit on the register transfer level or behavior level, even if its design is intended for, for example, 0.3 $\mu$m generation, can be applied as is to designing semiconductor chips of 0.2 $\mu$m process. Such reuse of design property is carried out not only internally within a semiconductor products manufacturer. Distribution of design property among semiconductor products manufacturers by networking also begins; thereby, one manufacturer reuses a logic circuit designed by another manufacturer for designing its semiconductor chips. Design property of pre-designed logic circuits is called Intellectual Property (IP).

With a remarkable advance of digital information processing equipment, typically personal computers, the performance requirements of semiconductor chips rapidly augment year by year. Operating frequency over 1 GHs is required and for semiconductor chips to be mounted on mobile communications equipment driven by battery power, such as portable telephones, reduced power consumption requirement for longer battery life is significant. Logic circuits must be designed to meet these more strict requirements as specifications thereof. Even if the design period on the HDL description level can be cut down by means of design property distribution over a network, the design period of the logic synthesis process will be longer due to meeting more strict requirements. Consequently, a problem arises that the period of designing a semiconductor chip as a whole cannot be cut sufficiently. As a typical example, to attain the target operating frequency of a semiconductor chip, it is necessary to set the delay of all signal paths in the logic circuits on the chip to fall within target cycles of delay. If only one signal path exists that contravenes delay limit requirement, the target frequency cannot be attained. Thus, logic circuit delay design takes the longest design period among the phases of the logic synthesis process. The semiconductor chip design period depends on whether the design team has high-level skill and expertise of delay design.

SUMMARY OF THE INVENTION

In the present invention, a logic circuit design method and system are offered in which logic circuits of desired performance can be designed within a shorter period, without increasing the logic design period to fulfill the requirements of circuit area, operating speed, power consumption, etc. as target specifications. Particularly, a logic circuit design method and system are provided for shortening the design period in phases of designing detailed gate level netlists after designing logic circuits on the register transfer level or behavior level, described in HDL, Heretofore, logic circuits described in HDL have been recognized as design property and logic circuit designers have practiced using IP held by someone else in designing their products. However, if the logic synthesis ability is insufficient as described above, the overall design capability cannot be enhanced even if only the logic circuits described in HDL are distributed over a network. Addressing this problem, in the present invention wherein such detailed design skill, particularly, a logic synthesis design skill is considered as one property, a logic circuit design method and system are provided by making effective use of a design skill attained and possessed by someone else as IP when designing semiconductor chips.

By applying the present invention, logic circuit designers can make effective use of a design skill attained and possessed by someone else as IP when designing semiconductor chips so that a semiconductor chip design process as a whole will be made efficient.

In the present invention, one party at a first design site who designed a circuit with logic functions on the register transfer level or behavior level and performed logic synthesis on the circuit, but could not attain desired circuit performance requests another party at a second design site to perform logic synthesis processing again. After the processing, a design charge shall be paid to the party at the second design site, depending on the improvement made to the performance of the gate level logic circuit generated at the first design site. Prior to the request, both parties at the first and second sites must agree about the performance parameters of the gate level logic circuit generated at the first design site.

The first design site and the second design site are connected by a network and information for design, such as a logic circuit, library, logic synthesis CAD tool (program), etc. is transferred to the first site. Notwithstanding that an optical or magnetic recording medium can be used to send data files, quick information transfer over the network especially serves the purpose of cutting the design period.

The party at the second design site can use its proprietary circuit construction technique or IP to generate a gate level logic circuit. If the party of the second design site generates a gate level logic circuit, using IP that is not held by the party at the first site, it must offer the information about the IP to the party at the first site.

If the party at the second design site employs a logic synthesis CAD tool to generate a gate level logic circuit, it can license the party at the first design site to use the logic synthesis CAD tool in designing the logic circuit.

For this limited licensing, it is necessary to limit the program operation to a specific object. Thus, the program comprises a processing (logic synthesis) subprogram to be executed to perform predetermined processing, a feature extraction subprogram for extracting the features of an input object to identify the object for which the processing program can be executed to perform the processing, and an execution enable/disable judgment subprogram to judge whether to enable or disable the processing execution by comparing the features of the object permitted to undergo the logic synthesis and the features extracted from the input object by the feature extraction subprogram. If this program structure applies to the logic synthesis CAD tool, it is desirable to use information that seldom changes throughout a design period as the features of the object (i.e., logic circuit).

Semiconductor manufacturers have lately been and are practicing actively logic circuit design (IP) distribution over a network. Even if such IP distribution is used, the purchaser of the IP must execute logic synthesis on an RTL logic circuit to output a gate level logic circuit. However, the circuit performance attained varies considerably, depending on whether the logic synthesis is good or bad as noted above. Addressing this, the present invention is preferably embodied such that the logic synthesis CAD tool employed by the IP seller can be used with the distributed logic circuit. Consequently, the logic synthesis executed by the IP seller can also be executed on the purchaser side. With this manner of embodiment, it is desirable to apply the above-described program structure to limit the use of the logic synthesis CAD tool to the IP.

Other and further objects, features and advantages of the invention will appear more fully from the following description.

BRIEF DESCRIPTION OF THE DRAWINGS

A preferred form of the present invention illustrated in the accompanying drawings in which:

FIG. 3 shows an exemplary design tariff in Embodiment 1;

DETAILED DESCRIPTION OF THE PREFERRED EMBODIMENTS

With reference to the appended drawings, preferred embodiments of the present invention will now be described.

Figure 1:
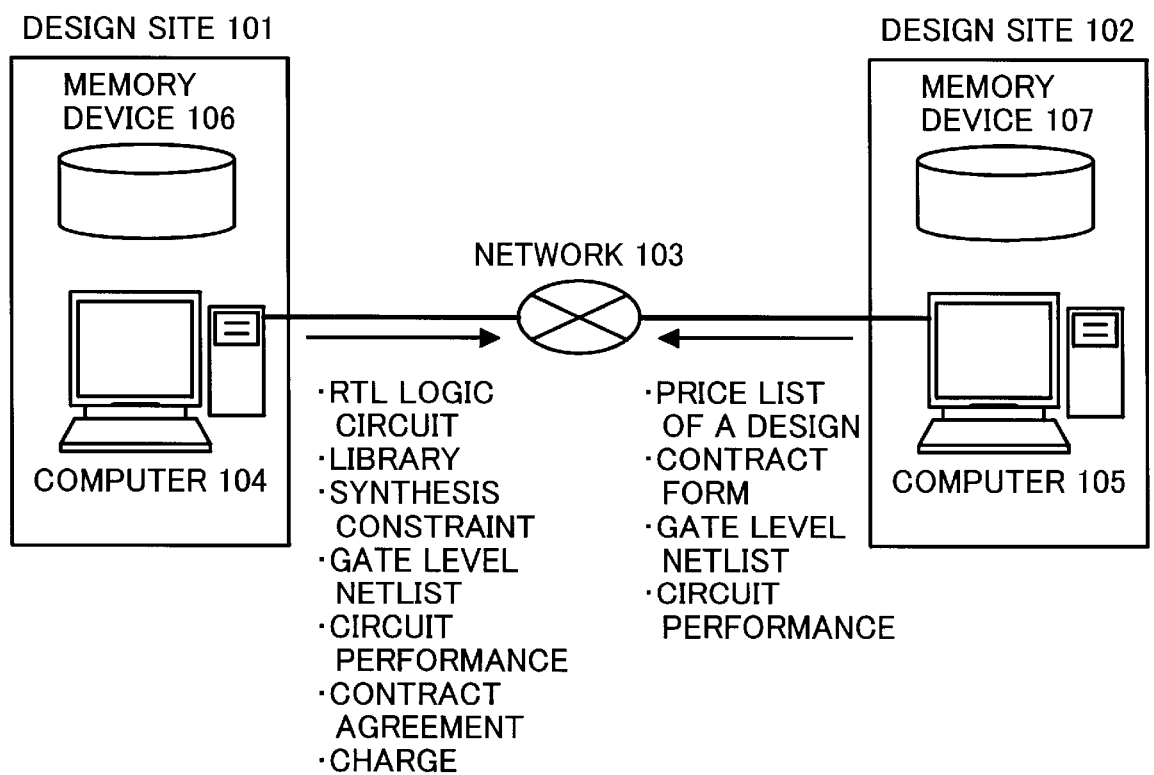
FIG. 1 is a schematic representation of a logic circuit design system according to the present invention.

FIG. 1 schematizes a logic circuit design system as a preferred Embodiment 1 of the present invention. A party at a first design site 101 has a task of designing a gate level logic circuit (netlist) fulfilling desired circuit performance (circuit area, operating speed, consumed power, etc.) by carrying out logic synthesis to a logic circuit on a register transfer level (RTL logic circuit). In Embodiment 1, it is assumed that the party at the first design site 101, however, cannot design a gate level logic circuit (netlist) fulfilling target circuit performance with its logic synthesis CAD tool or that the party wants to design that gate level logic circuit (netlist) within a shorter period. On the other hand, another party at a second design site 102 has a logic synthesis CAD tool or expertise for improving the circuit performance, by which the party performs logic synthesis to the RTL logic circuit.

The first design site 101 is furnished with a computer 104 and a memory device 106, whereas the second design site 102 is furnished with a computer 105 and a memory device 107. The computer 104 and the computer 105 can be interconnected by a network 103. The network 103 may be either a leased line or a public network.

Arrows shown indicate information and files to be transferred over the network 103 between the two design sites 101 and 102. An arrow starting from the side of the first design site 101 indicates information and files to be sent from the first design site 101 to the second design site 102. Another arrow starting from the side of the second design site 102 indicates information and files to be sent from the second design site 102 to the first design site 101. The information and files to be sent from the first design site 101 to the second design site 102 include the RTL logic circuit on which logic synthesis is performed, a library in which cells that are used for logic synthesis are stored, synthesis constraints, a gate level netlist generated by logic synthesis at the first design site 101, the circuit performance of that gate level netlist, contract agreement, and a charge for improvement to the performance. The information and files to be sent from the second design site 102 to the first design site 101 include a price list of a design, contract, a gate level netlist generated by logic synthesis at the second design site 102, the circuit performance of that gate level netlist.

By referring to FIG. 2, design processing to be performed respectively at both sites and information to be transferred between the sites will now be explained in time series. The party at the first design site 101 designs an RTL logic circuit (201). In this step 201, the party at the first site 101 may use an existing logic circuit (IP) instead of designing a new logic circuit. Then, the party at the first design site 101 generates a gate level netlist by carrying out logic synthesis using its local library and the synthesis constraints for the above RTL logic circuit and obtains the performance evaluation of the generated circuit (202).

The information obtained by the above steps is sent to the design site 102 (203). Hereon, it is natural that the party at the second design site 102 is bound to observe secrecy; i.e., all the received information sent from the first design site 101 shall not be disclosed to a third party. The party at the second design site 102 confirms the evaluated circuit performance it received and evaluates the possibility of improving the performance (204). The purpose of this confirmation is to verify that the evaluated circuit performance is attained by the gate level netlist received from the design site 101. It is necessary that the circuit performance before improvement be confirmed at both sites in order that a charge will be paid for the effect of improvement to the circuit performance, made by the party at the second design site in the present design system as will be described later.

If the party at the second design site 102 undertakes the logic synthesis on the RTL logic circuit it received, it sends the first site a design price list for the rates of improvement to the circuit performance and the contract form (205). The contract prescribes a limited period of design to be completed by the party at the second design site 102 or charges are fixed for predetermined design periods in the tariff. If charges are fixed for predetermined design periods in the tariff, the shorter the time taken for the party at the second design site 102 to complete the design, the higher will be the charge. If the party at the first design site 101 assents to the tendered tariff, it sends the second site contract agreement (206). Security of sending the contract document in the electronic form over the network can be assured by attaching electronic signature to the contract, which is a publicly known technique. Of course, the contents of the contract can be revised by mutual agreement, or additionally, written contracts may be exchanged between the both parties.

If the party at the first design site has contracted the other party at the second site for refining its logic circuit design, the party at the second site 102 carries out logic synthesis on the RTL logic circuit it received from the first design site 101. Hereupon, by using a synthesis skill and expertise proper to the party at second design site 102, a gate level netlist with improved performance is generated. Logic synthesis is performed, using the library distributed from the first design site 101. This is because the cells stored in the library not only represent logic functions, but also include the information for integrated circuit layout on a chip under specific design rules which depend on the fabrication process in which designed semiconductor chips are finally fabricated. If the party at the first design site 101 contracts with another company for the fabrication of semiconductor chips and the second design site 102 can separately access the library for the fabrication process that the company applies, of course, specifying the library name is only to be done at the first design site 101. It is not necessary for the first design site 101 to send the library to the second design site 102. Moreover, the party at the second design site 102 evaluates the performance of the generated gate level netlist (for the parameters of circuit area, circuit operating frequency, and power consumption) (207). For example, operating frequency can be evaluated by using a static timing analysis tool which is based on publicly known art. Power consumption can be analyzed by a static power analysis tool or simulation with benchmark data. If benchmark data is used, benchmark data is set commonly for the step 202, step 207, and step 209 which will be described later under the contract with the party at the first design site 101.

The second design site 102 sends the generated gate level netlist and the result of evaluating the circuit performance to the first design site 101 (208). The party at the first design site 101 confirms whether the gate level netlist actually attains the performance as reported from the second design site 102 by evaluating the circuit (209). If the result is confirmed, the party at the first design site 101 pays the charge to the party at the second site, according to the contract.

FIG. 3 gives an example of the tariff. In the tariff example given in FIG. 3, charges are fixed, depending on how the operating frequency improved as the index of performance improvement. The detailed charges are set for the rates of improvement to the operating frequency and the predetermined periods which terminates by sending the result to the first design site 101. Under the tariff table, the tolerances of circuit area and power consumption are specified as synthesis constraints.

Figure 4:
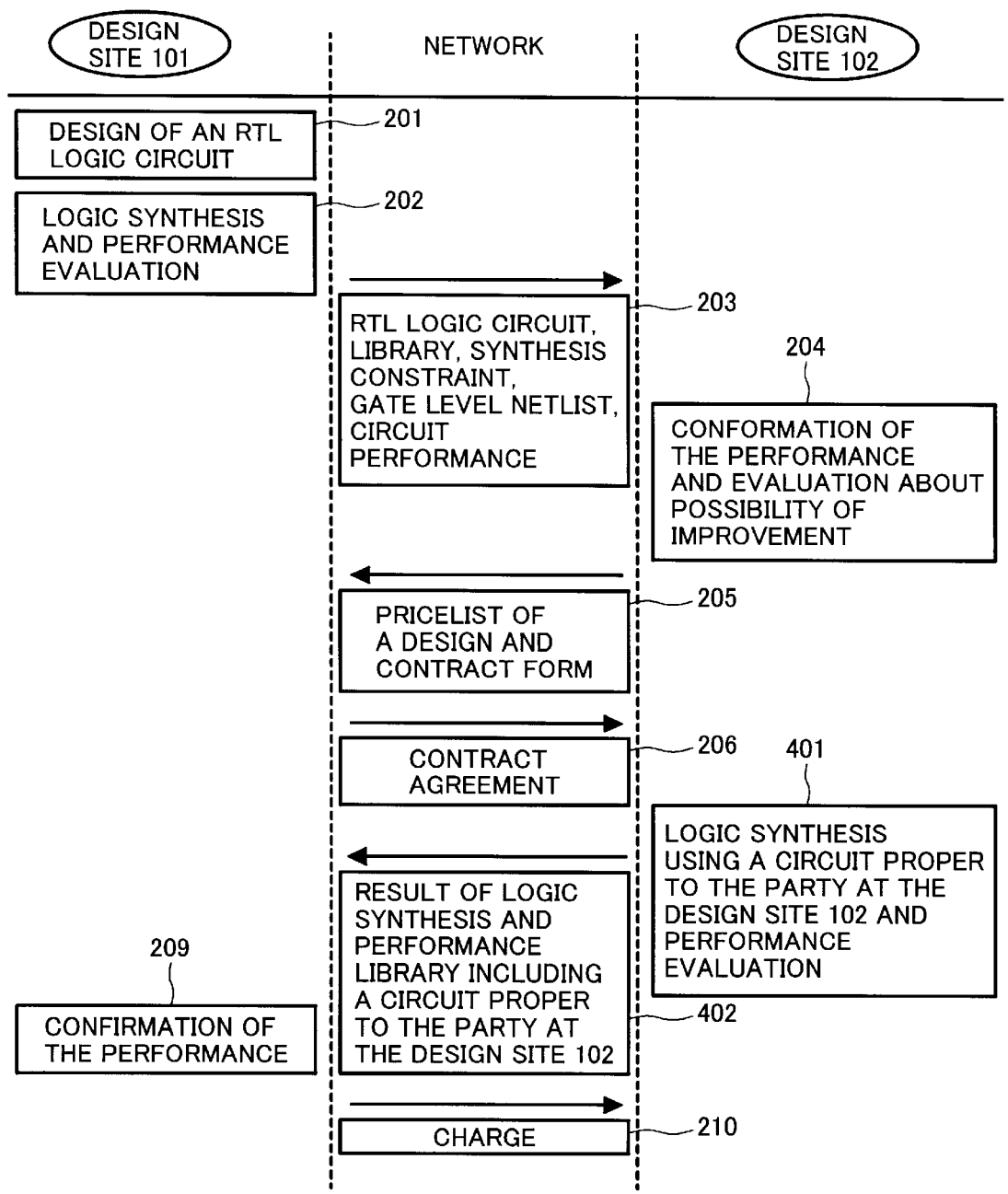
FIG. 4 is a diagram representing the processing and information flow in a logic circuit design method according to a preferred Embodiment 2 of the present invention.

With reference to FIG. 4, then, a preferred Embodiment 2 of the present invention will be explained below. Embodiment 2 differs from Embodiment 1 in the following. When carrying out logic synthesis on the RTL logic circuit received from the first design site 101, the party at the second design site 102 uses its proprietary circuit construction technique or netlist (IP, pre-designed circuit elements having predetermined logic functions are stored as "cells" with cell performance parameters such as logic function, layout size, delay, power consumption, etc. in a library), thereby improving the logic circuit performance. Moreover, the royalty (license fee) for the circuit designed, based on IP, as well as the charges set for the rates of improvement to the circuit performance are tendered and payment is made accordingly.

Figure 2:
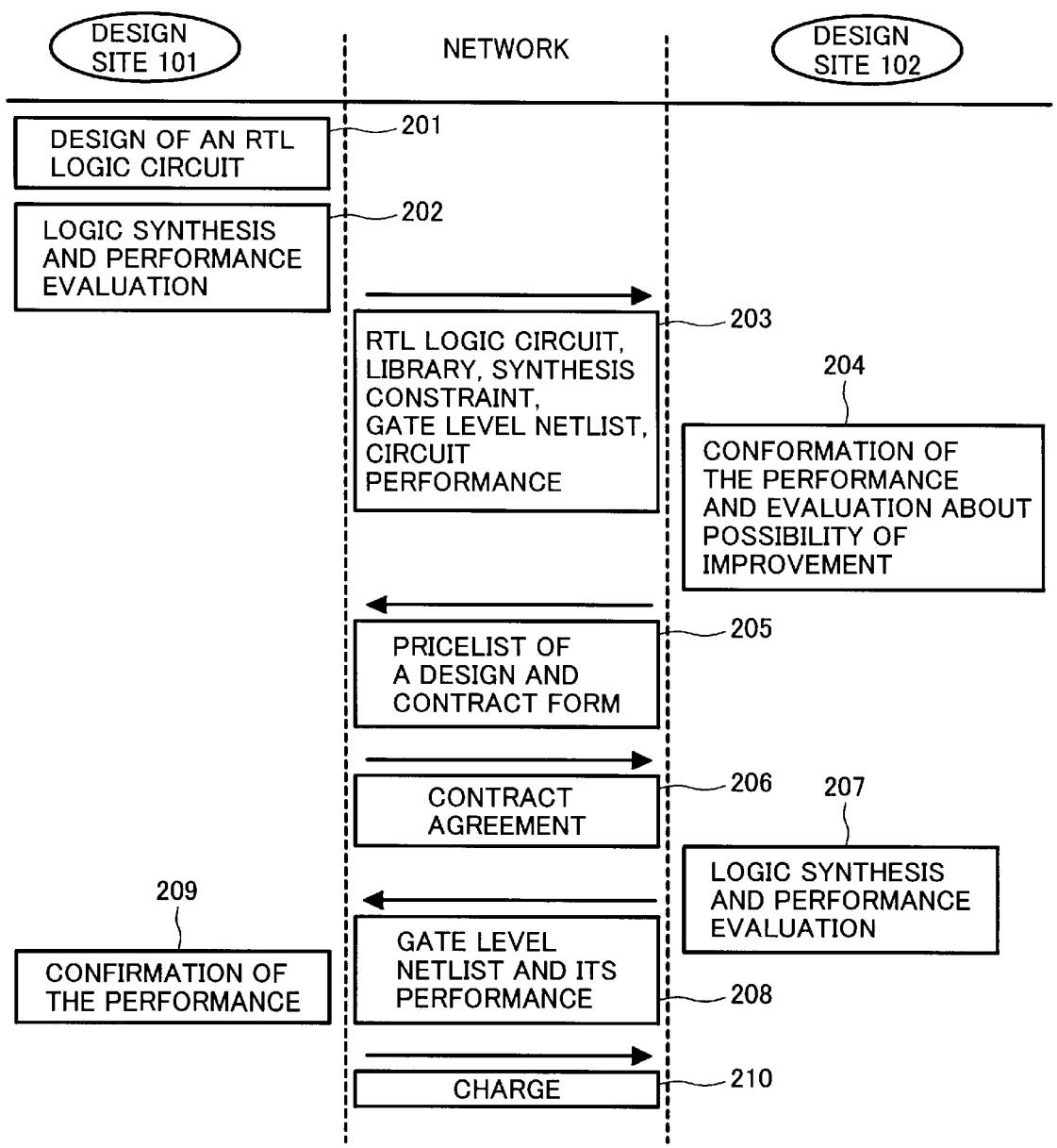
FIG. 2 is a diagram representing the processing and information flow in a logic circuit design method according to a preferred Embodiment 1 of the present invention.

FIG. 4 differs from FIG. 2 in the process of logic synthesis to be carried out at the second design site 102; that is, the party at the second design site 102 improves the performance of the gate level netlist by using its proprietary circuit construction technique or IP (401).

As the circuit construction technique, for example, a circuit construction technique for reducing sub-threshold current across a MOS transistor in a standby state disclosed in JP-A-210976/1993 is mentioned. By adding a circuit generated by the above technique to the netlist received from the first design site 101, it is possible to improve the power consumption performance of the netlist. Moreover, assume that the party at the second design site 102 knows the logic construction of an arithmetic logical unit that is higher performance than the same unit adopted by the party at the first design site 101. In this case, the party at the second site would substitute its proprietary higher-performance arithmetic logical unit for the arithmetic logical unit in the netlist it received from the first design site 101 so that the performance of the netlist could be improved.

As IP, for example, a logic circuit comprising cells using pass transistors disclosed in JP-A-130856/1995 is mentioned. These pass transistor cells make it possible to obtain various logic outputs by changing the mode of signal application to the cells. By using these cells, higher performance difficult to attain for general CMOS cells may be easily achieved. Moreover, assume that the party at the second design site 102 holds the IP of a flip-flop that is lower power consumption than the flip-flop adopted by the party at the first design site 101. In this case, the party at the second site would substitute its proprietary lower-power-consumption flip-flops for the flip-flops in the netlist it received from the first design site 101 so that the performance of the netlist could be improved.

The above-mentioned circuit construction technique example is assumed to be the one by which the circuit can be designed with the cells in a library held at the first design site 101. On the other hand, the above-mentioned IP example is assumed to be the one that provides the cells not included in any library held at the first design site 101. Thus, IP that is applicable to the present embodiment must be fit for the fabrication process adopted by the party at the first design site 101. The second design site 102 must send the library including the IP to the first design site 101 so that further layout design or the like can be performed at the first design site 101 (402).

The tariff that should apply to Embodiment 2, in addition to the charges based on how the operating frequency improved and the predetermined design periods as is the case in Embodiment 1, includes the royalty (license fee) for the designed circuit. The royalty should be set, depending on the sales of the final semiconductor chip products using the designed logic circuit, supplied by the party at the first design site 101. This royalty is paid for the circuit construction technique or IP provided by the party at the second design site 102.

Figure 5:
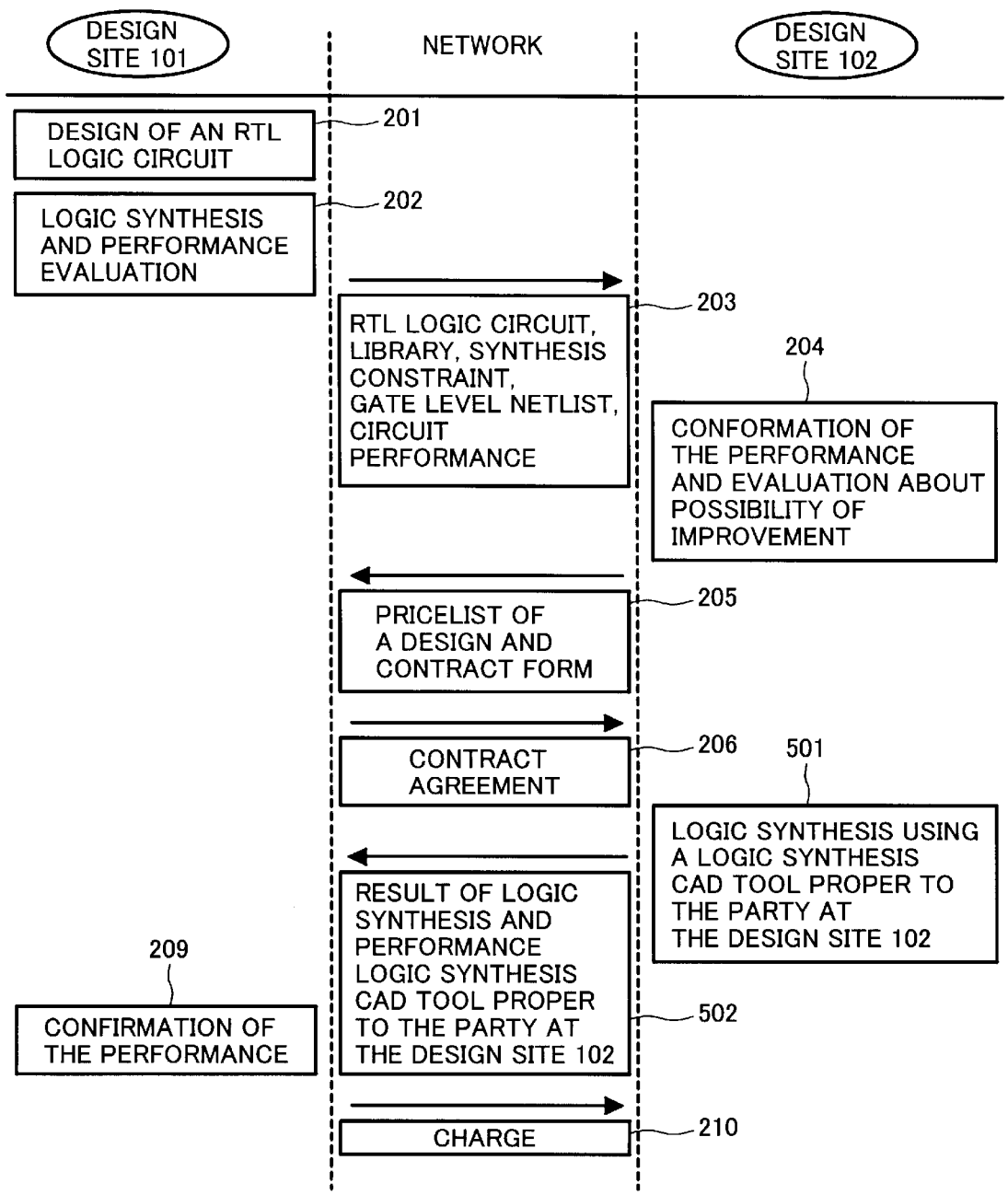
FIG. 5 is a diagram representing the processing and information flow in a logic circuit design method according to a preferred Embodiment 3 of the present invention.

With reference to FIG. 5, then, a preferred Embodiment 3 of the present invention will be explained below. Embodiment 3 differs from Embodiment 1 in the following. When carrying out logic synthesis on the RTL logic circuit received from the first design site 101, the party at the second design site 102 uses a logic synthesis CAD tool (501) proper to it, thereby improving the logic circuit performance. Moreover, the royalty (license fee) for the logic synthesis CAD tool as well as the charges set for the rates of improvement to the circuit performance are tendered and payment is made accordingly.

FIG. 5 differs from FIG. 2 in the files to be sent from the second design site 102 to the first design site 101 include the logic synthesis CAD tool employed in the logic synthesis performed at the second design site 102 (502).

In the process of designing a logic circuit, it often happens that design error is detected in a gate level logic circuit that has been once generated. In such cases, the designer must return to the netlist described in HDL, make correction, and re-execute logic synthesis. If such design error takes place, the party at the first site must again request the party at the second design site 102 to carry out logic synthesis on the corrected RTL logic circuit. If the correction is minor, it may be preferable to execute logic synthesis at the first design site 101 rather than requesting it again. However, if the party at the second design site 102 uses a logic synthesis CAD tool proper to it (e.g., the in-house made one), the same logic synthesis is impossible for the first design site 101 to do as in the second design site 102. Thus, the party at the first design site 101 is licensed to use the logic synthesis CAD tool employed by the second design site 102 in carrying out logic synthesis.

As an example of such logic synthesis CAD tool, there is a logic synthesis method disclosed in JP-A-161470/1999. According to this logic synthesis method, a higher speed logic circuit is generated in the procedure below. A logic circuit configured with cells is converted to the corresponding circuit configured with selectors. Delay reduction processing is executed for the logic circuit configured with selectors and this circuit is reconverted to the logic circuit configured with cells. As another example of the logic synthesis CAD tool, plug-in software is mentioned that is effective for improving the performance of a gate level netlist at the second design site 102.

The tariff that should apply to Embodiment 3, in addition to the charges based on how the operating frequency improved and the predetermined design periods as is the case in Embodiment 1, includes the royalty (license fee) for the logic synthesis CAD tool. Hereon, two kinds of licensing can be set: one is a complete license that licenses the party at the first site to freely use the logic synthesis CAD tool also in designing netlists other than the netlist under contract; the other is a limited license that the party at the first site to use the CAD tool only in designing the netlist under contract. For the limited license, steps should be taken to prevent the party at the first design site 101 from applying the CAD tool also to designing other netlists in violation of contract. By referring to FIG. 6, an example of the steps will be explained below.

At the first design site 101, initial design of an RTL logic circuit 800 is made and the designed RTL logic circuit 802 is sent (830) to the second design site 102. Assume that the RTL logic circuit 802 has a name, for example, "block1" and input ports "X, Y, Z" and output ports "A, B, C, D." The logic synthesis CAD tool executes an RTL logic synthesis process 808, thus creating a gate level netlist file 804, and performs information processing for identifying the RTL logic circuit under contract. The information processing comprises a feature extraction process 806 and a feature encryption process 807 for the RTL logic circuit. In the feature extraction process 806, given information that seldom changes for a specific logic circuit is preset and extracted from the RTL logic circuit 802. Such information may be, for example, the logic circuit name, input and output ports, the number of registers installed in the logic circuit, and the names of the registers which seldom change comparatively throughout a design period. From the RTL logic circuit 802, label information such as "block1," "X, Y, Z" and "A, B, C, D" is extracted as the features for identifying that logic circuit. Then, the features are encrypted in the feature encryption process 807. This is because what information is used for identifying the logic circuit keeps secret from the party at the first design site 101. An encoded feature file 820 is thus generated and sent from the second design site 102 to the first design site 101 together with the gate level netlist 804 and the logic synthesis CAD tool (835). The distributed logic synthesis CAD tool (program) at least comprises a logic synthesis subprogram to be executed to implement logic synthesis, a logic circuit feature extraction subprogram for extracting the features of a logic circuit to identify the logic circuit for which the logic synthesis subprogram can be executed to implement the logic synthesis, an execution enable/disable judgment subprogram that judges whether to enable or disable the logic synthesis by comparing the features of the logic circuit permitted to undergo the logic synthesis and the features extracted from a logic circuit by the logic circuit feature extraction subprogram. Preferably, the CAD tool further comprises a logic circuit feature input subprogram for reading the feature file of the logic circuit permitted to undergo logic synthesis and a decoding subprogram for decoding the encoded feature file.

At the first design site 101, modification is made to the RTL logic circuit 801 due to design error detected or for other reason and a modified RTL logic circuit 803 is generated. In the example shown in FIG. 6, by logic modification, the output ports changes from "A, B, C, D" to "A, B, C, E." The logic synthesis CAD tool executes the feature extraction process 806 for the newly input RTL logic circuit prior to the logic synthesis process and reads the encoded feature file 820 and decodes the file (809). The tool compares the features extracted from the new RTL logic circuit and the features decoded (810). If the match rate between both feature data is higher than a reference value, the tool executes the logic synthesis process 808; if the match rate is lower than the reference value, it does not execute the logic synthesis process 808. Feature label information for identifying a logic circuit is not limited to the above-mentioned items; other information maybe used. Encryption and decryption or decoding can be performed by using a publicly known method thereof.

Not only for the logic synthesis CAD tool, the above-described licensing method can be applied to licensing of other software; that is, it is applicable to general programs for predetermined processing of the data from an input file and outputting a result file. The licensing method in Embodiment 3 can be applied to, for example, language translation software.

Figure 7:
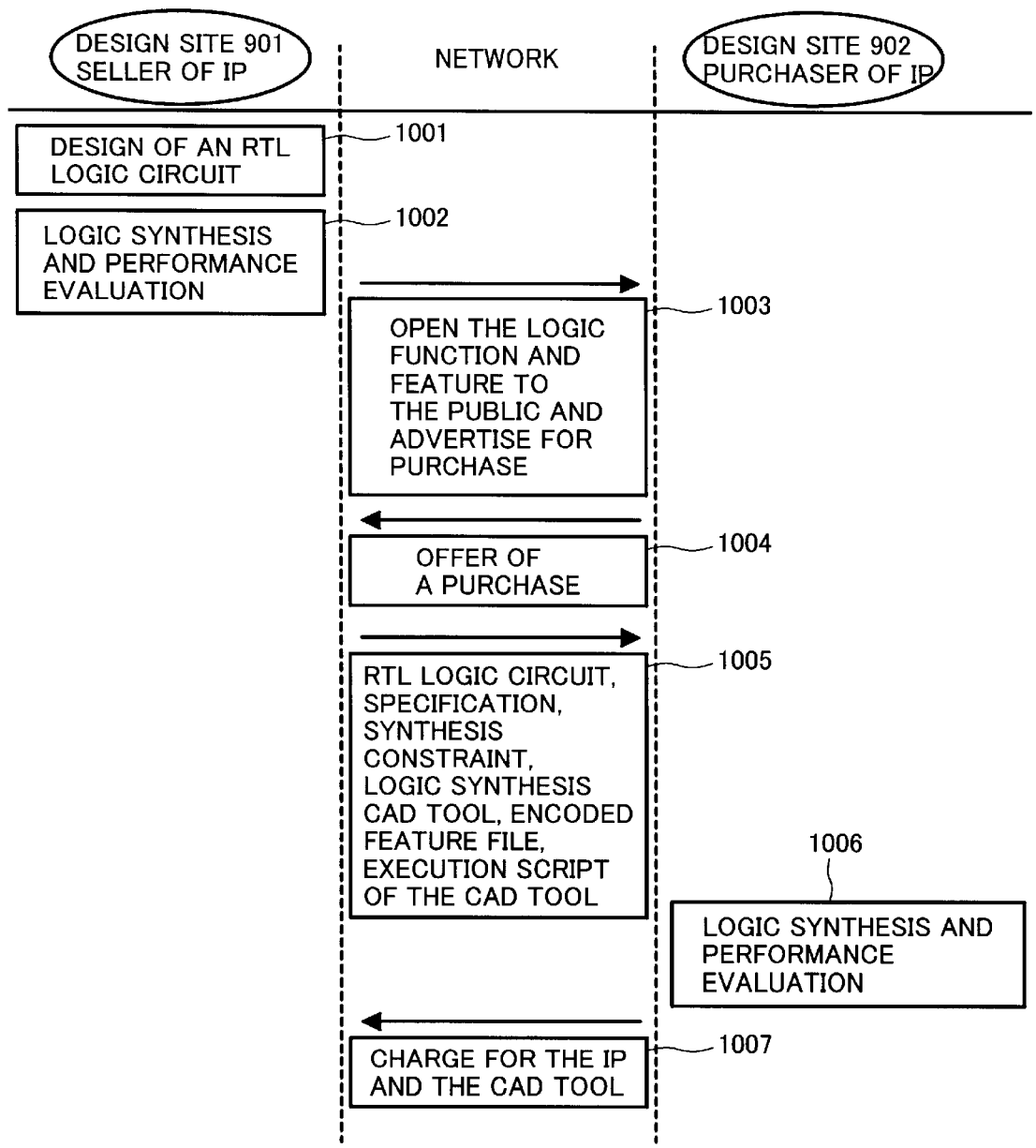
FIG. 7 is a diagram representing the processing flow in a logic circuit design method according to a preferred Embodiment 4 of the present invention.
Figure 8:
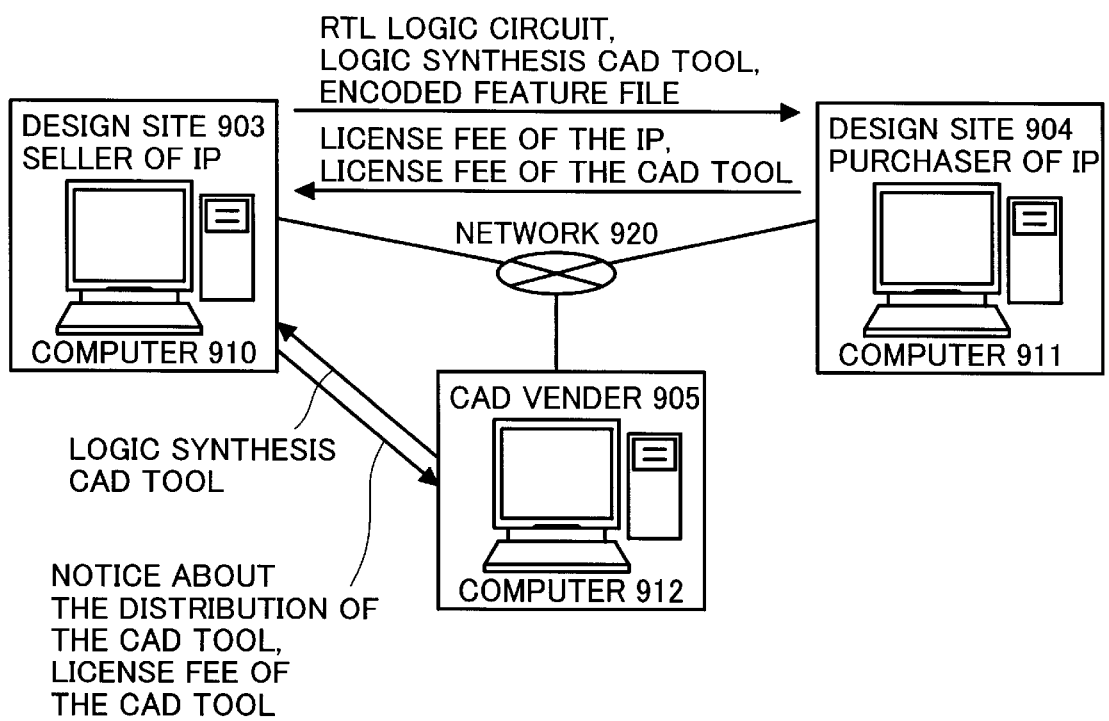
FIG. 8 is a schematic representation of a logic circuit design system according to a preferred Embodiment 5 of the present invention.

Next, a preferred Embodiment 4 of the present invention will now be described. Embodiment 4 is a method intended for smoothing logic circuit design distribution over a network that semiconductor manufacturers have lately been and are practicing actively. Logic circuits on the register transfer level or behavior level described in HDL are usually distributed over a network as design property (IP). Notwithstanding that, logic circuits described in HDL have an advantage that they can be used without being restricted by fabrication process, the purchaser of IP thereof need to perform logic synthesis. However, it may happen that expected circuit performance cannot be attained by logic synthesis, which is considered as a problem as described above. Addressing this problem, Embodiment 4 enables the purchaser of IP to execute the logic synthesis CAD tool employed by the seller of IP in design. According to Embodiment 4, the logic synthesis CAD tool employed by the seller of IP is attached to the logic circuit described in HDL to sell and the circuit and tool are together distributed as design property over a network. Hereon, it is desirable for the seller to limit the use of the logic synthesis CAD tool to the IP sold. Thus, the limited licensing method described in Embodiment 3 is used. With reference to FIG. 7, Embodiment 4 will be illustrated below.

A party at the first design site 901 that designs a logic circuit (IP) to sell designs an RTL logic circuit (1001). The designed RTL logic circuit is design property to be distributed over a network. At the first design site 901, logic synthesis on the RTL logic circuit is performed and the circuit performance is evaluated (1002). The party sells the RTL logic circuit that gained the evaluated performance.

Figure 6:
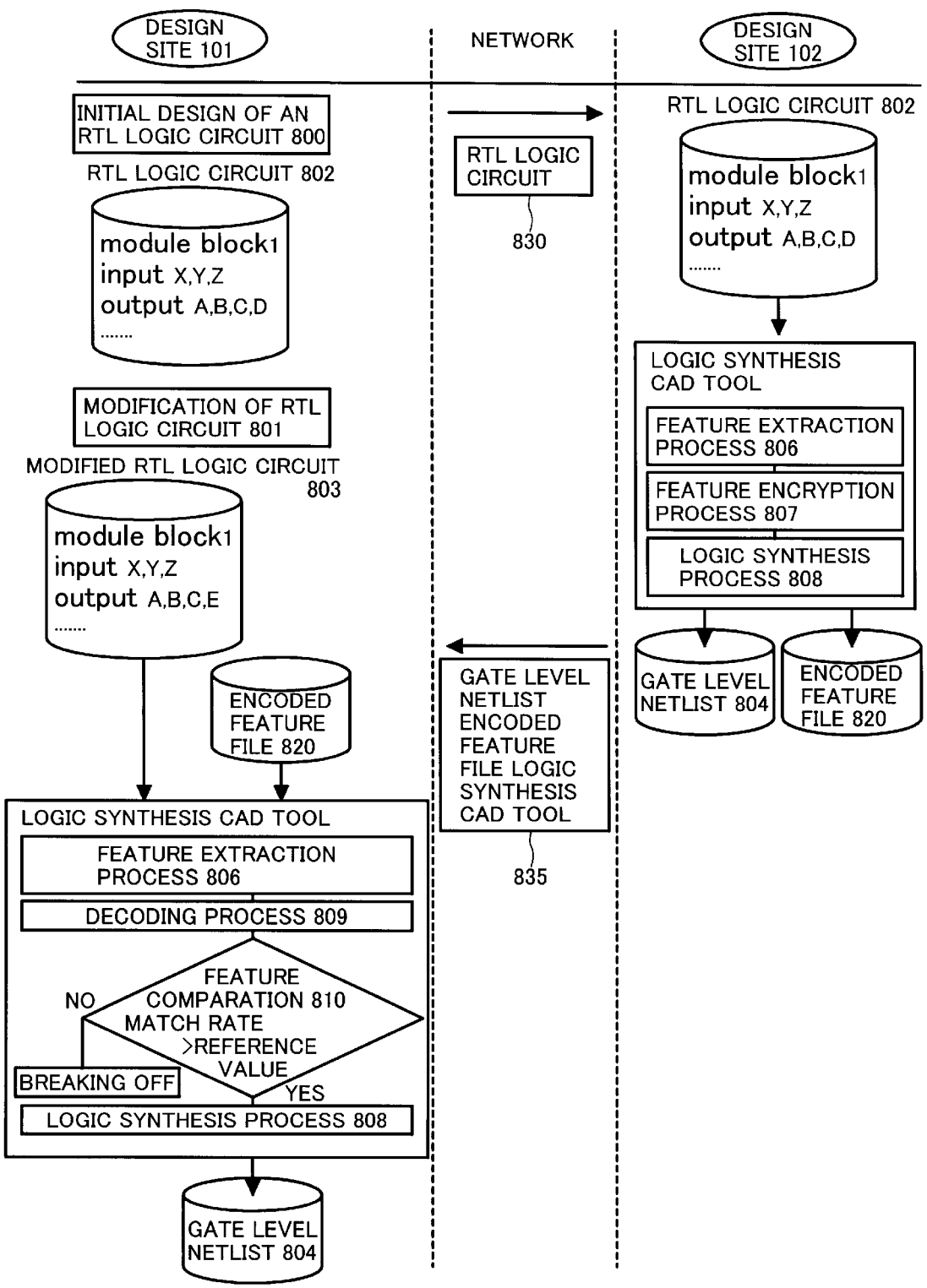
FIG. 6 is a diagram illustrating a method of limited licensing of a logic synthesis CAD tool.

The party at the first design site 901 opens the logic functions and post-logic-synthesis performance of the RTL logic circuit as its design property and seeks a purchaser thereof. Assume that a party at the second design site 902 places an order with the party at the first design site 901 for the logic circuit and related items and concluded a contract with the party at the first site (1004). The first design site 901 sends the second site the RTL logic circuit file, functional specifications of logic circuit, and a synthesis environment set consisting of the logic synthesis CAD tool, whereof the purchaser is licensed to use the tool, but its use is limited to the RTL logic circuit, synthesis constraints and an execution script controlling the execution of logic synthesis (1005). To limit the licensing of the logic synthesis tool to the RTL logic circuit, an encoded feature file of the RTL logic circuit, described in relation to FIG. 6, is added to the above-mentioned items. Logic synthesis by the logic synthesis CAD tool is executed for an RTL file only if the match rate between the features extracted from the file and the features decoded from the feature file is higher than the reference value. Thus, logic synthesis by the distributed logic synthesis CAD tool is substantially enabled only for the purchased RTL logic circuit.

Next, a preferred Embodiment 5 of the present invention will now be described, wherein a party at the first design site 903 performs logic synthesis on a logic circuit by using a logic synthesis CAD tool held by a third party as its proprietary product (the third party is, for example, a CAD vendor). Based on the performance of the thus generated gate level logic circuit, the refined RTL logic circuit is sold. In addition to the party at the first design site 903 that is the seller of the RTL logic circuit and another party at the second design site 904 that is assumed to be a purchaser of the logic circuit, the CAD vendor 905 exists. The computers 910, 911, and 912 respectively owned by these three parties are interconnected by a network 920. The relation between the first design site 903 and the second design site 904 is the same as in Embodiment 4. From the first design site 903, the RTL logic circuit and logic synthesis CAD tool are sent over the network to the second site as is the case in Embodiment 4. At this time, a limited license of the logic synthesis CAD tool, described in Embodiments 3 and 4, is granted to the party at the second site. The party at the second design site 904 pays the royalty (license fee) for the RTL logic circuit and logic synthesis CAD tool to the party at the first design site 902 over the network. For the royalty (license fee) for the logic synthesis CAD tool, however, the party at the first design site 902 acting for the CAD vendor 903 performs licensing and collecting the royalty, but does not gain it. Thus, the party at the first design site 903 notifies the CAD vendor 905 that it distributed the logic synthesis CAD to the other design site 904 and the royalty (license fee) for the logic synthesis CAD tool, paid by the party at the other design site 904, is forwarded via the first design site 903 to the CAD vendor.

The CAD vendor may pay the party at the first design site 903 an agency fee as the party at the first design site 903 sells the logic synthesis CAD tool as its agent. Alternatively, the party at the first design site 903 may have the privilege of using the logic synthesis CAD tool at a discount of the royalty (license fee). As modification of the present embodiment, distribution may be carried out in the following manner. When the party at the second design site 904 places an order with the party at the first design site 903 for the RTL logic circuit and logic synthesis CAD tool, the first design site forwards the order notification to the logic synthesis CAD vendor. Then, the RTL logic circuit is distributed from the first design site 903 to the second design site 904, whereas the logic synthesis CAD tool is distributed from the CAD vendor 905 to the second design site 904.

While illustrative description of the invention made by the inventor(s) has been made, based on the preferred embodiments of the invention, the described embodiments are to be considered only as illustrated and not restrictive. It is to be understood that changes and variations may be made without departing from the spirit or scope of the invention. For example, in the above-described illustrative cases, the RTL logic circuit, IP, and logic synthesis CAD tool are distributed over a network, whereas it is possible that they are written to an optical or magnetic recording medium and the medium is distributed. Distribution using a medium has a feature of easy transmission a large quantity of data.

The foregoing invention has been described in terms of preferred embodiments. However, those skilled, in the art will recognize that many variations of such embodiments exist. Such variations are intended to be within the scope of the present invention and the appended claims.

What is claimed is:

1. The A logic circuit design method in which a logic circuit on a register transfer level or a behavior level, generated at a first site, is transferred to a second site at which logic synthesis on the circuit is performed, comprising:

receiving a first logic circuit on the register transfer level or behavior level and a second logic circuit on a gate level output from logic synthesis executed on said first site by using a first library and under synthesis constraints for said first logic circuit, sent from said first site;

evaluating said second logic circuit performance and confirming that evaluated performance agrees with the performance of said second logic circuit evaluated on said first site;

generating a third logic circuit on the gate level by executing logic synthesis on said first logic circuit, using said first library and under the synthesis constraints for said first logic circuit;

evaluating said third logic circuit performance and evaluating performance improvement by comparing the third logic circuit performance with the second logic circuit performance which was evaluated and confirmed as the agreed one; and sending said third logic circuit and information on the performance improvement to said first site;

wherein a party at said second site receives a design charge which is set, depending on the performance improvement from a party at said first site.

2. The logic circuit design method as recited in claim 1 wherein:

said third logic circuit is generated by using cells not included in said first library in addition to said first library and under the synthesis constraints for said first logic circuit; and in addition to said third logic circuit and the information on the performance improvement, a second library containing said cells is sent to said first site.

3. The logic circuit design method as recited in claim 2, wherein:

the party at said second site receives the royalty for said cells from the party at said first site.

4. The logic circuit design method as recited in claim 1, wherein:

in addition to said third logic circuit and the information on the performance improvement, a logic synthesis CAD tool employed to generate said third logic circuit is sent to said first site.

5. A logic circuit design in which a logic circuit on a register transfer level or a behavior level, generated at first site, is transferred to a second site at which logic synthesis on the circuit is performed, said first and second sites being connected by a network so that information can be transferred therebetween, comprising:

receiving said first logic circuit on the register transfer level or behavior level sent over said network from said first site;

generating a second logic circuit by executing logic synthesis on said first logic circuit, using a first library employed at said first site and under synthesis constraints for said first logic circuit;

evaluating said second logic circuit performance and evaluating performance improvement by comparing the evaluated performance of said second logic circuit with the evaluated performance of a gate level logic circuit output from logic synthesis on said first logic circuit, executed on said first site, by employing said first library; and sending said second logic circuit and information on the performance improvement over said network to said first site;

wherein a party at said second site receives a design charge which is set, depending on the performance improvement from a party at said first site.

6. The logic circuit design method as recited in claim 5, wherein:

said second circuit is generated by using cells not included in said first library in addition to said first library and under the synthesis constraints for said first logic circuit; and in addition to said second logic circuit and the information on the performance improvement, a second library containing said cells is sent over said network to said first site.

7. The logic circuit design method as recited in claim 5, wherein:

in addition to said second logic circuit and the information on the performance improvement, a logic synthesis CAD tool employed to generate said second logic circuit is sent over said network to said first site.

* * * * *